United States Patent
Lazar

(10) Patent No.: US 10,180,263 B2
(45) Date of Patent: Jan. 15, 2019

(54) ROBUST HEATING, VENTILATION, AND AIR CONDITIONING COMMUNICATION CHANNELS

(71) Applicant: Lennox Industries Inc., Richardson, TX (US)

(72) Inventor: Steve Charles Lazar, San Antonio, TX (US)

(73) Assignee: Lennox Industries, Inc., Richardson, TX (US)

(*) Notice: Subject to any disclaimer, the term of this patent is extended or adjusted under 35 U.S.C. 154(b) by 371 days.

(21) Appl. No.: 14/925,550

(22) Filed: Oct. 28, 2015

(65) Prior Publication Data

US 2017/0122610 A1    May 4, 2017

(51) Int. Cl.

| | |
|---|---|
| G05B 19/042 | (2006.01) |
| F24F 11/62 | (2018.01) |
| F24F 11/30 | (2018.01) |
| F24F 11/70 | (2018.01) |
| G05D 23/19 | (2006.01) |
| F24F 11/63 | (2018.01) |
| F24F 13/00 | (2006.01) |
| H04L 1/00 | (2006.01) |
| F24F 110/10 | (2018.01) |
| F24F 110/20 | (2018.01) |

(Continued)

(52) U.S. Cl.
CPC ............ *F24F 11/62* (2018.01); *F24F 11/30* (2018.01); *F24F 11/56* (2018.01); *F24F 11/63* (2018.01); *F24F 11/64* (2018.01); *F24F 11/70* (2018.01); *F24F 13/00* (2013.01); *F24F 2110/10* (2018.01); *F24F 2110/20* (2018.01); *F24F 2120/10* (2018.01); *G05B 19/042* (2013.01); *G05B 19/0423* (2013.01); *G05B 2219/2614* (2013.01); *G05B 2219/2642* (2013.01); *G05D 23/1917* (2013.01); *G05D 23/1931* (2013.01); *H04L 1/0045* (2013.01)

(58) Field of Classification Search
CPC ............... F24F 11/0086; F24F 11/0012; F24F 11/0015; F24F 11/006; G05B 15/02; G05B 2219/2614
See application file for complete search history.

(56) References Cited

U.S. PATENT DOCUMENTS 4,501,125 A * 2/1985 Han ................... F24F 11/0009
                                                  236/1 EA

FOREIGN PATENT DOCUMENTS

WO    WO 2015014229 A1 * 2/2015 ............. G05D 22/02

* cited by examiner

*Primary Examiner* — Mohamed Charioui
*Assistant Examiner* — Christine Liao
(74) *Attorney, Agent, or Firm* — Baker Botts L.L.P.

(57) ABSTRACT

A heating, ventilation, and air conditioning (HVAC) communication method comprising generating, at a transmitter device, a primary signal and a secondary signal. Each of the signals comprise digital temperature data and digital humidity data. The secondary signal is a phase shifted representation of the primary signal. The HVAC communication method further comprises transmitting the primary signal and the secondary signal to a receiver device via a wireless link. The method continues by storing a look-up table that maps bit streams to temperature values and humidity values. The method continues by performing, at the receiver device, a comparison using the primary signal to execute error checking, and determining, at the receiver device, a temperature value and a humidity value using the look-up table based on the comparison.

16 Claims, 5 Drawing Sheets

(51) Int. Cl.
*F24F 120/10* (2018.01)
*F24F 11/64* (2018.01)
*F24F 11/56* (2018.01)

ROBUST HEATING, VENTILATION, AND AIR CONDITIONING COMMUNICATION CHANNELS

TECHNICAL FIELD

This disclosure relates generally to heating, ventilating, and air conditioning (HVAC) systems, and more specifically to system and method for communicating between HVAC devices.

BACKGROUND

Existing heating, ventilation, and air conditioning (HVAC) systems use hardwired connections as a communication channel to communicate control signals between a thermostat and other HVAC devices. Hardwired connections are reliable. However, relocating the thermostat may be difficult and expensive. Using a wireless connection as a communication channel between a thermostat and other HVAC devices may be susceptible to jamming or interference from other wireless devices. It is desirable to provide a reliable communication channel between a thermostat and other HVAC devices that allows the thermostat to be easily relocated.

SUMMARY

In one embodiment, the disclosure includes a heating, ventilation, and air conditioning (HVAC) system comprising a temperature sensor and a first analog-to-digital converter (ADC) operably coupled to the temperature sensor and configured to output digital temperature data. The HVAC system further comprises a humidity sensor and a second ADC operably coupled to the humidity sensor and configured to output digital humidity data. The HVAC system further comprises a first radio transmitter configured to transmit a primary signal that comprises the digital temperature data and the digital humidity data and a second radio transmitter configured to transmit a secondary signal that comprises the digital temperature data and the digital humidity data. The HVAC system further comprises a first memory operable to store a look-up table that maps bit streams to temperature values and humidity values and a first microprocessor operably coupled to the first ADC, the second ADC, the first radio transmitter, the second radio transmitter, and the first memory, and configured to generate the primary signal and the secondary signal, wherein the secondary signal is a phase shifted representation of the primary signal. The HVAC system further comprises a first radio receiver configured to receive the primary signal, a second radio receiver configured to receive the secondary signal, a second memory operable to store the look-up table that maps bit streams to temperature values and humidity values. The HVAC system further comprises a second microprocessor operably coupled to the first radio receiver, the second radio receiver, and the memory, and configured to perform a comparison using the primary signal to execute error checking and determine a temperature value and a humidity value using the look-up table based on the comparison.

In another embodiment, the disclosure includes an HVAC communication method comprising generating, at a transmitter device, a primary signal that comprises digital temperature data and digital humidity data and a secondary signal that is a phase shifted representation of the primary signal and transmitting the primary signal and the secondary signal to a receiver device via a wireless link. The HVAC communication method further comprises storing, at the receiver device, a look-up table that maps bit streams to temperature values and humidity values, performing a comparison using the primary signal to execute error checking, and determining a temperature value and a humidity value using the look-up table based on the comparison.

In yet another embodiment, the disclosure includes an HVAC device comprising a first radio receiver configured to receive a primary signal comprising digital temperature data and digital humidity data, a second radio receiver configured to receive a secondary signal that is a phase shifted representation of the primary signal, and a memory operable to store a look-up table that maps bit streams to temperature values and humidity values. The HVAC device further comprises a microprocessor operably coupled to the first radio receiver, the second radio receiver, and the memory. The microprocessor is configured to use a phase shift to align the primary signal and the secondary signal, perform a bit-by-bit comparison between the primary signal and the secondary signal, determine a temperature value and a humidity value using the primary signal to identify the temperature value and the humidity value in the look-up table when the primary signal and the secondary signal are the same, and determine the temperature value and the humidity value using the secondary signal to identify the temperature value and the humidity value in the look-up table when the primary signal and the secondary signal are different.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Disclosed herein are various embodiments for providing a robust wireless communication channels for HVAC systems. In an embodiment, an HVAC system employs a plurality of radio signals (e.g. a primary signal and a secondary signal) to communicate data among HVAC devices and equipment in the HVAC system. The radio signals are processed using error detecting techniques to validate the transmitted data and to determine temperature values and/or humidity values using a look-up table that maps bits streams to temperature values and humidity values. Various embodiments may increase the security, privacy, and robustness of wireless communication channels for an HVAC system.

Figure 1:
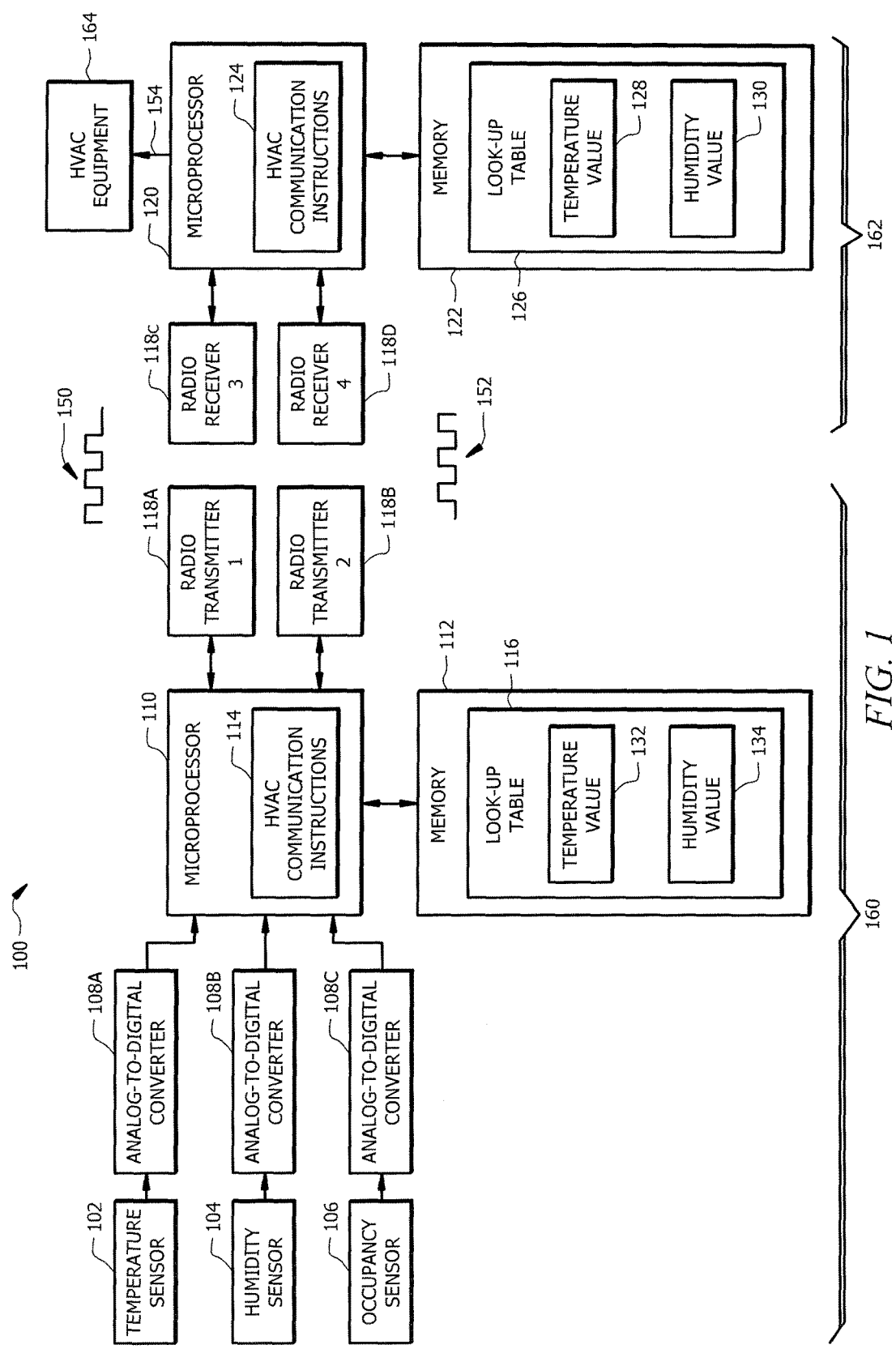
FIG. 1 is a schematic diagram of an embodiment of a heating, ventilation, and air conditioning (HVAC) system.

FIG. 1 is a schematic diagram of an embodiment of a heating, ventilation, and air conditioning (HVAC) system 100. The HVAC system 100 comprises an HVAC transmitter device 160 in signal communication with an HVAC receiver device 162 via a wireless connection. The HVAC system 100 is configured to collect temperature, humidity, and occupancy data and to transmit the collected data from the HVAC transmitter device 160 to the HVAC receiver device 162 using a primary signal 150 and a secondary signal 152. The HVAC receiver device 162 is configured to receive the primary signal 150 and the secondary signal 152, validate the transmitted data, determine a temperature value and a humidity value based on the transmitted data, and output a control signal based on the determined temperature value and humidity value.

In an embodiment, the HVAC transmitter device 160 is or is incorporated within a thermostat for the HVAC system 100. In another embodiment, the HVAC transmitter device 160 may be incorporated within HVAC equipment. For example, the HVAC transmitter device 160 may be incorporated within a heater, an air conditioner, a compressor, a blower, a vent, a duct, or any other HVAC equipment as would be appreciated by one of ordinary skill in the art upon viewing this disclosure. The HVAC transmitter device 160 comprises a temperature sensor 102, a humidity sensor 104, an occupancy sensor 106, analog-to-digital converters (ADCs) 108A, 108B, and 108C, radio transmitters 118A and 118B, a first microprocessor 110, and a first memory 112. The HVAC transmitter device 160 may be configured as shown or in any other suitable configuration.

The temperature sensor 102 is operably coupled to a first ADC 108A. Examples of a temperature sensor 102 include, but are not limited to, thermocouples and infrared (IR) thermometers. The temperature sensor 102 may comprise any suitable temperature sensor as would appreciated by one of ordinary skill in the art upon viewing this disclosure. The temperature sensor 102 is configured to measure a temperature (e.g. a room temperature) and to output temperature data as a signal (e.g. an analog signal) that represents the measured temperature. The temperature sensor 102 may be configured to sample the temperature continuously or at predetermined intervals of time. In an embodiment, the sample rate of the temperature sensor 102 may be adjustable based on the rate of temperature change. For example, the sample rate of the temperature sensor 102 may be adjustable between one sample per minute to one sample per second depending on the rate the temperature changes. In an embodiment, the temperature sensor 102 may be configured to measure temperature in increments of 0.25°. Alternatively, the temperature sensor 102 may be configured to measure temperature in any other suitable increments.

The humidity sensor 104 is operably coupled to a second ADC 108B. An example of the humidity sensor 104 includes, but is not limited to, a capacitor-type humidity sensor. The humidity sensor 104 may comprise any suitable humidity sensor as would be appreciated by one of ordinary skill in the art upon viewing this disclosure. The humidity sensor 104 is configured to measure humidity and to output humidity data as a signal (e.g. an analog signal) that represents the measured humidity. The humidity sensor 104 may be configured to sample humidity continuously or at predetermined intervals of time.

The occupancy sensor 106 is operably coupled to a third ADC 108C. An example of the occupancy sensor 106 includes, but is not limited to, an IR sensor. The occupancy sensor 106 may comprise any suitable occupancy sensor as would be appreciated by one of ordinary skill in the art upon viewing this disclosure. The occupancy sensor 106 is configured to detect whether an object is present and to output occupancy data as a signal (e.g. an analog signal) that indicates whether or not an object is detected. The occupancy sensor 106 may be configured to sense continuously or at predetermined intervals of time. In an embodiment, the occupancy sensor 106 may be optional and may be omitted.

ADCs 108A-108C are configured to convert analog signals to digital signals. The first ADC 108A is operably coupled to the temperature sensor 102 and the first microprocessor 110 and is configured to receive analog temperature signals from the temperature sensor 102 and to output digital temperature signals to the first microprocessor 110. The second ADC 108B is operably coupled to the humidity sensor 104 and the first microprocessor 110 and is configured to receive analog humidity signals from the humidity sensor 104 and to output digital humidity signals to the first microprocessor 110. The third ADC 108C is operably coupled to the occupancy sensor 106 and the first microprocessor 110 and is configured to receive analog occupancy signals from the occupancy sensor 106 and to output digital occupancy signals to the first microprocessor 110.

The first memory 112 may comprise one or more disks, tape drivers, or solid-state drives and may be used as an over-flow data storage device, to store programs when such programs are selected for execution, and to store instructions and data that are read during program execution. The first memory 112 may be volatile or non-volatile and may comprise read-only memory (ROM), random-access memory (RAM), ternary content-addressable memory (TCAM), dynamic random-access memory (DRAM), and static random-access memory (SRAM). The first memory 112 is operable to store a look-up table 116 that comprises a predetermined mapping between a plurality of bit streams and a range of temperature values 132 and a range of humidity values 134. In an embodiment, each bit stream is mapped to a temperature value 132 or a humidity value 134. For example, a first bit stream may be mapped to a first temperature value (e.g. 80°), a second bit streams may be mapped to a second temperature value (e.g. 81°), and so on. In an another embodiment, each a bit stream may be mapped to a combined temperature value 132 and humidity value 134. For example, a first bit stream is mapped to the combination of a first temperature value and a first humidity value, a second bit stream mapping is mapped to the combination of a second temperature value and a second humidity value.

The first microprocessor 110 may be implemented as one or more central processing unit (CPU) chips, logic units, cores (e.g. as a multi-core processor), field-programmable gate arrays (FPGAs), application specific integrated circuits (ASICs), or digital signal processors (DSPs). The first microprocessor 110 is operably coupled to and in signal communication with the first ADC 108A, the second ADC 108B, the third ADC 108C, the first radio transmitter 118A, the second radio transmitter 118B, and the first memory 112. The first microprocessor 110 may be operably coupled to one or more other devices (e.g. a display) (not shown) or pieces of HVAC equipment (e.g. a compressor, a vent, or a duct) (not shown). The first microprocessor 110 is configured to process data, for example, digital temperature data, digital humidity data, and digital occupancy data, and may be implemented in hardware or software.

In FIG. 1, the HVAC communication instructions 114 for the HVAC transmitter device 160 are implemented as instructions (e.g. software code or firmware) stored in the first microprocessor 110. Alternatively, the HVAC communication instructions 114 for the HVAC transmitter device 160 may be implemented as instructions stored in the first memory 112. The inclusion of the HVAC communication instructions 114 for the HVAC transmitter device 160 provides an improvement to the functionality of the HVAC system 100, which effects a transformation of the HVAC system 100 to a different state.

The HVAC communication instructions 114 for the HVAC transmitter device 160 are implemented by the first microprocessor 110 to execute instructions for generating the primary signal 150 and the secondary signal 152 using the digital temperature data, digital humidity data, and/or digital occupancy data and outputting the primary signal 150 and the secondary signal 152 to the first radio transmitter 118A and the second radio transmitter 118B, respectively. The HVAC communication instructions 114 comprises instructions for generating the primary signal 150 as a data packet using the look-up table 116 and bit streams that correspond with the digital temperature data, digital humidity data, and/or digital occupancy data. In an embodiment, a bit stream may correspond with a temperature value 132 or a humidity value 134. In another embodiment, a bit stream may correspond with a combination of a temperature value 132 and a humidity value 134.

The HVAC transmitter device 160 may use the look-up table 116 to identify bit streams that correspond with a particular digital temperature data value and/or digital humidity value. As an example, the HVAC transmitter device 160 may use the digital temperature data to identify or to look-up a first bit stream that is mapped to a temperature value 132 that corresponds with the digital temperature data and use the digital humidity value to identify or to look-up a second bit stream in the look-up table 116 that is mapped to a humidity value 134 that corresponds with the digital humidity value. The HVAC transmitter device 160 may then generate a data packet that comprises the first bit stream and the second bit stream.

The data packet may be formatted such that each data type (e.g. temperature, humidity, and occupancy) is delimited by a header. For example, the data packet may comprise a temperature data header, a temperature data payload that comprises a bit stream that represents the digital temperature data, a humidity data header, a humidity payload that comprises a bit stream that represents the digital humidity data, an occupancy data header, and an occupancy data payload that comprises the digital occupancy data. The data packet may be encoded or encrypted using any suitable technique as would be appreciated by one of ordinary skill in the art upon viewing this disclosure. The secondary signal 152 is a phase shifted representation of the primary signal 150 and comprises the same data as the primary signal 150. The secondary signal 152 may be generated by applying a phase shift or an offset (e.g. a bit shift offset) to the primary signal. For example, the primary signal 150 and the secondary signal 152 may be offset from each other by one or more bit shifts.

Radio transmitters 118A and 118B are operably coupled to the first microprocessor 110. Examples of radio transmitters 118A and 118B include, but are not limited to, a surface acoustic wave (SAW) oscillator and a pulsed transistor switch. The radio transmitters 118A and 118B may further comprise one or more antennas. The first radio transmitter 118A is configured to receive the primary signal 150 from the first microprocessor 110 and to wirelessly transmit the primary signal 150 to the HVAC receiver device 162. The second radio transmitter 118B is configured to receive the secondary signal 152 from the first microprocessor 110 and to wirelessly transmit the secondary signal 152 to the HVAC receiver device 162. The radio transmitters 118A and 118B may employ any modulation technique for transmitting the primary signal 150 and the secondary signal 152 as would be appreciated by one of ordinary skill in the art upon viewing this disclosure. Examples of modulation techniques include, but are not limited to, code-division multiple access (CDMA) and phase-shift keying (PSK). Further, the radio transmitters 118A and 118B may employ any multiplexing technique for transmitting the primary signal 150 and the secondary signal 152 as would be appreciated by one of ordinary skill in the art upon viewing this disclosure. Examples of multiplexing techniques include, but are not limited to, time-division multiplexing (TDM) and frequency-division multiplexing (FDM). In an embodiment, radio transmitters 118B and/or 118B may be replaced with a radio transceiver.

The HVAC receiver device 162 comprises radio receivers 118C and 118D, a second microprocessor 120, and a second memory 122. The HVAC receiver device 162 may be configured as shown or in any other suitable configuration. Radio receivers 118C and 118D are operably coupled to the second microcontroller 120. The radio receivers may comprise one or more antennas. Any suitable radio receivers 118C and 118D may be employed as would be appreciated by one of ordinary skill in the art upon viewing this disclosure. Radio receiver 118C is configured to receive the primary signal 150 from the HVAC transmitter 160 and to output the primary signal 150 to the second microprocessor 120. Radio receiver 118D is configured to receive the secondary signal 152 from the HVAC transmitter 160 and to output the secondary signal 152 to the second microprocessor 120. Radio receivers 118C and 118D may also be configured decode, decrypt, and/or demultiplex the primary signal 150 and the secondary signal 152. Further, radio receivers 118C and 118D may also be configured to resolve and restore weak bits in the primary signal 150 and the secondary signal 152. In an embodiment, radio receivers 118C and/or 118D may be replaced with a radio transceiver.

The second memory 122 may be implemented similarly to the first memory 110. The second memory 122 is operable to store a look-up table 126 that comprises a predetermined mapping between bit streams and temperature values 128 and humidity values 130. The look-up table 126 comprises the same mapping between bit streams and temperature values and humidity values as described above for look-up table 116 in the first memory 112. The HVAC receiver device 162 may use bit streams that are received from the HVAC transmitter device 160 and the look-up table 126 to determine a temperature value 128 and/or a humidity value 130.

The second microprocessor 120 may be implemented similarly to the first microprocessor 110. The second microprocessor 120 is operably coupled to and in signal communication with the first radio receiver 118C, the second radio receiver 118D, the second memory 122, and HVAC equipment 164. The second microprocessor 120 may be operably coupled to one or more other devices (e.g. a display) (not shown). The second microprocessor 120 is configured to process data, for example, the primary signal and the secondary signal, and may be implemented in hardware or software.

In FIG. 1, the HVAC communication instructions 124 for the HVAC receiver device 162 are implemented as instructions (e.g. software code or firmware) stored in the second microprocessor 120. Alternatively, the HVAC communication instructions 124 for the HVAC receiver device 162 may be implemented as instructions stored in the second memory 122. The inclusion of the HVAC communication instructions 124 for the HVAC receiver device 162 provides an improvement to the functionality of the HVAC system 100, which effects a transformation of the HVAC system 100 to a different state.

The HVAC communication instructions 124 for the HVAC receiver device 162 are implemented by the second microprocessor 120 for performing a comparison using the primary signal 150 to execute error checking and determining a temperature value 128 and a humidity value 130 using the look-up table 126 based on the comparison. In an embodiment, the HVAC communication instructions 124 comprise instructions for receiving the primary signal 150 and the secondary signal 152 and comparing the primary signal 150 to bit streams in the look-up table 126 to determine whether the primary signal 150 is present in the look-up table 126. For example, the HVAC receiver device 162 may process (e.g. demodulate, decode, or parse) the primary signal 150 to identify bit streams in the primary signal 150. The HVAC receiver device 162 may then compare bit streams in the primary signal 150 to the bit streams in the look-up table 126 to determine whether the primary signal 150 is present in the look-up table 126. The primary signal 150 is present in the look-up table 126 when one or more bit streams in the primary signal 150 match corresponding bit streams in the look-up table 126. For example, the primary signal 150 is present when the bit pattern of the bit stream in the primary signal 150 matches the bit pattern for a bit stream in the look-up table 126.

The HVAC communication instructions 126 further comprises instructions for the HVAC receiver device 162 to use the primary signal 150 to identify a temperature value 128 and a humidity value 130 in the look-up table 126 when the primary signal 150 is present in the look-up table 126 and to use the secondary signal 152 to identify the temperature value 128 and the humidity value 130 in the look-up table 126 when the primary signal 150 is not present in the look-up table 126. For example, the HVAC receiver device 162 may use the bit stream of the primary signal 150 to identify the temperature value 128 and/or humidity value 130 that are mapped to the corresponding bit stream in the look-up table 126 when the primary signal 150 is present in the look-up table 126. Alternatively, the HVAC receiver device 162 may use a bit stream of the secondary signal 152 to identify the temperature value 128 and/or humidity value 130 that are mapped to a corresponding bit stream in the look-up table 126 when the primary signal 150 is not present in the look-up table 126.

The HVAC communication instructions 126 further comprises instructions for the HVAC receiver device 162 to output a control signal 154 to HVAC equipment 164 based on the temperature value 128 and the humidity value 130. The control signal 154 may indicate commands or actions to be performed by the HVAC equipment 164 based on the determined temperature value 128 and humidity value 130. For example, the control signal 154 may indicate to turn on HVAC equipment 164, to turn off HVAC equipment 164, to adjust HVAC equipment 164, or any other action as would be appreciated by one of ordinary skill in the art upon viewing this disclosure. Additionally or alternatively, the control signal 154 may comprise the determined temperature value 128 and humidity value 130. For example, the HVAC receiver device 162 may send to the determined temperature value 128 and humidity value 130 to the HVAC equipment 164 for further processing by the HVAC equipment 164 to determine an action to perform based on the temperature value 128 and the humidity value 130.

In another embodiment, the HVAC communication instructions 124 comprise instructions for receiving the primary signal 150 and the secondary signal 152 and using a phase shift to align the primary signal 150 and the secondary signal 152. The HVAC receiver device 162 performs a bit shift or a phase shift on the primary signal 150 or the secondary signal 152 to align the primary signal 150 and secondary signal 152 such that corresponding data types (e.g. temperature and humidity) are aligned. For example, a bit stream that corresponds with the digital temperature data in the primary signal 150 is aligned with a bit stream that corresponds with the digital temperature data in the secondary signal 152, and so on.

The HVAC communication instructions 124 further comprise instructions for the HVAC receiver 162 to perform a bit-by-bit comparison between the primary signal 150 and the secondary signal 152. For example, the HVAC receiver device 162 may traverse bit streams in the primary signal 150 and bit streams in the secondary signal 152 bit-by-bit to determine whether the corresponding bit streams in the primary signal 150 and the secondary signal 152 are the same. The HVAC receiver device 162 may determine that a bit stream in the primary signal 150 and a bit stream in the secondary signal 152 are the same when corresponding bits within the bit streams are the same. In other words, a bit stream in the primary signal 150 and a bit stream in the secondary signal 152 are the same when the bit value (i.e. 1 or 0) for each bit in the bit stream in the primary signal 150 is the same bit value as a corresponding bit in the bit stream in the secondary signal 152. Alternatively, the HVAC receiver device 162 may compare the bit streams in the primary signal 150 to the bit streams in the secondary signal 162 using a word-by-word comparison or any other suitable technique for determining whether corresponding bit streams in the primary signal 150 and the secondary signal 152 are the same as would be appreciated by one of ordinary skill in the art upon viewing this disclosure.

The HVAC communication instructions 124 further comprise instructions for the HVAC receiver 162 to use the primary signal 150 to identify the temperature value 128 and the humidity value 130 in the look-up table 126 when the primary signal 150 and the secondary signal 152 are the same and to use the secondary signal 152 to identify the temperature value 128 and the humidity value 130 in the look-up table 126 when the primary signal 150 and the secondary signal 152 are different. For example, the HVAC receiver device 162 may compare bit streams in the primary signal 150 to bit streams in the look-up table 126 to identify corresponding bit streams in the look-up table 126 and to identify the temperature value 128 and/or humidity value 130 that are mapped to the corresponding bit streams in the look-up table 126 when the primary signal 150 and the secondary signal 152 are the same. Alternatively, the HVAC receiver device 162 may use bit streams of the secondary signal 152 to identify corresponding bit streams in the look-up table 126 and to identify the temperature value 128 and/or humidity value 130 that are mapped to the corresponding bit streams in the look-up table 126 when the primary signal 150 and the secondary signal 152 are different.

The HVAC communication instructions 124 further comprise instructions for the HVAC receiver 162 to output a control signal 154 to HVAC equipment 164 based on the temperature value 128 and the humidity value 130. Outputting the control signal 154 may be performed similar to as described above. For example, the control signal 154 may indicate to turn on HVAC equipment 164, to turn off HVAC equipment 164, to adjust HVAC equipment 164, or any other action as would be appreciated by one of ordinary skill in the art upon viewing this disclosure. Additionally or alternatively, the control signal 154 may comprise the determined temperature value 128 and humidity value 130.

In another embodiment, the HVAC communication instructions 124 comprise instructions for receiving the primary signal 150 and the secondary signal 152 and using a phase shift to align the primary signal 150 and the secondary signal 152. The HVAC receiver device 162 performs a bit shift or a phase shift on the primary signal 150 or the secondary signal 152 to align the primary signal 150 and secondary signal 152 such that corresponding data types (e.g. temperature and humidity) are aligned. The HVAC communication instructions 124 further comprise instructions for the HVAC receiver 162 to combine the primary signal 150 and the secondary signal 152 using superposition to generate a combined signal. For example, the HVAC receiver device 162 may perform an AND operation between bit streams of the primary signal 150 and bit streams of the secondary signal 152 to generate the combined signal. Alternatively, the HVAC receiver device 152 may perform any other suitable technique for generating a combined signal using superposition. The combined signal comprises the one or more bit streams that correspond with the digital temperature data and the digital humidity data.

The HVAC communication instructions 124 further comprise instructions for the HVAC receiver 162 to compare the combined signal to bit streams in the look-up table 126 to determine whether the combined signal is present in the look-up table 126. For example, the HVAC receiver device 162 may compare the bit streams in the combined signal to the bit streams in the look-up table 126 to determine whether the combined signal is present in the look-up table 126. The combined signal is present in the look-up table 126 when one or more bit streams in the combined signal match corresponding bit streams in the look-up table 126. For example, the combined signal is present when the bit pattern of a bit stream in the combined signal 150 matches the bit pattern of a bit stream in the look-up table 126. The HVAC communication instructions 124 further comprise instructions for the HVAC receiver 162 to use the combined signal to identify the temperature value 128 and the humidity value 130 in the look-up table 126 when the combined signal is present in the look-up table 126. For example, the HVAC receiver device 162 may use bit streams of the combined signal to identify the temperature value 128 and/or humidity value 130 that are mapped to corresponding bit streams in the look-up table 126 when the combined signal is present in the look-up table 126. Additionally, the HVAC communication instructions 124 further comprise instructions for the HVAC receiver 162 to determine an error has occurred when the combined signal is not present in the look-up table 126. The HVAC receiver device 162 may trigger a flag or an alert when the combined signal is not present in the look-up table 126.

The HVAC communication instructions 124 further comprise instructions for the HVAC receiver 162 to output a control signal 154 to HVAC equipment 164 based on the temperature value 128 and the humidity value 130. Outputting the control signal 154 may be performed similar to as described above. For example, the control signal 154 may indicate to turn on HVAC equipment 164, to turn off HVAC equipment 164, to adjust HVAC equipment 164, or any other action as would be appreciated by one of ordinary skill in the art upon viewing this disclosure. Additionally or alternatively, the control signal 154 may comprise the determined temperature value 128 and humidity value 130.

In an embodiment, the HVAC receiver device 162 is operably coupled to and in signal communication with HVAC equipment 164. Examples of the HVAC equipment 164 include, but are not limited to, a heater, an air conditioner, a compressor, a blower, a vent, a duct, or any other HVAC equipment as would be appreciated by one of ordinary skill in the art upon viewing this disclosure. The HVAC equipment 164 may be operably coupled to the second microprocessor 120 via a wireless or wired connection. The HVAC equipment 164 is configured to receive a control signal 154 from the second microprocessor 120. The HVAC equipment 164 may be configured to use the control signal 154 to control a temperature within a room. For example, the HVAC equipment 164 may turn on an air conditioner or adjust a vent based on the control signal 154. In an alternative embodiment, the HVAC receiver device 162 may be or may be incorporated within the HVAC equipment 164.

Figure 2:
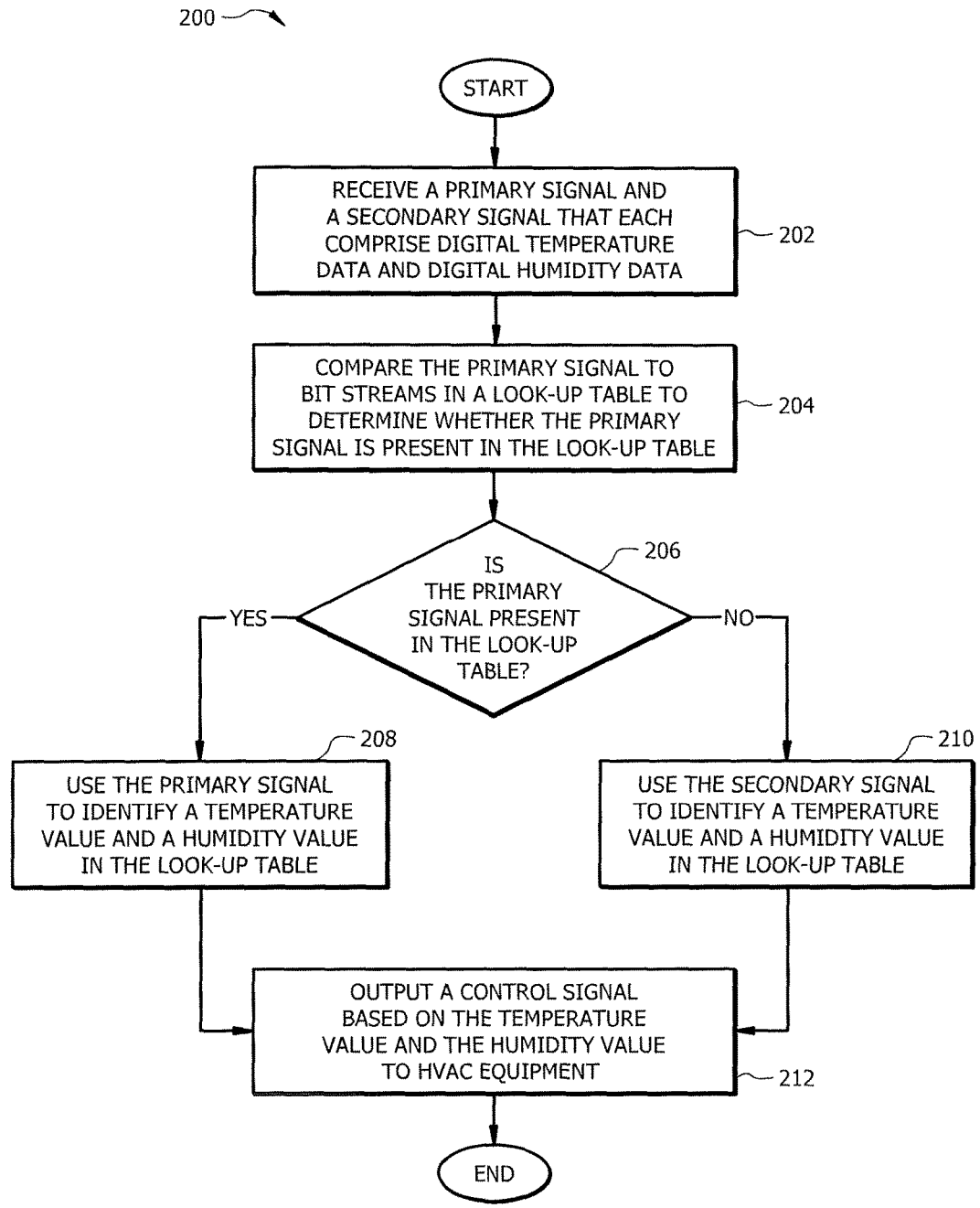
FIG. 2 is a flowchart of an embodiment of an HVAC communication method.

FIG. 2 is a flowchart of an embodiment of an HVAC communication method 200. Method 200 is implemented by an HVAC device to perform error checking on digital temperature data and digital humidity data that is transmitted using a primary signal and a secondary signal, to use the transmitted signals and a look-up table to determine a temperature value and a humidity value, and to output a control signal based on the temperature value and the humidity value. The HVAC device may be configured similarly to HVAC receiver device 162 in FIG. 1.

At step 202, the HVAC device receives a primary signal and a secondary signal that each comprise digital temperature data and digital humidity data. The primary signal may be or may be similar to the primary signal 150 and the secondary signal may be or may be similar to the secondary signal 152 in FIG. 1. The secondary signal is a phase shifted representation of the primary signal and comprises the same data as the primary signal. The HVAC device may process the primary signal and the secondary signal. For example, the HVAC device may parse, decode, decrypt, and/or demultiplex the primary signal and the secondary signal. At step 204, the HVAC device compares the primary signal to bit streams in a look-up table to determine whether the primary signal is present in the look-up table. The look-up table may be or may be similar to look-up table 126 in FIG. 1. For example, the HVAC device may compare bit streams in the primary signal that are associated with the digital temperature data and the digital humidity data to the bit streams in the look-up table. The HVAC device may compare the bit pattern of bit streams in the primary signal to the bit patterns of bit streams in the look-up table and may determine that the primary signal is present when the bit pattern of a bit stream in the primary signal matches a bit pattern of a bit stream in the look-up table. A bit pattern of a first bit stream matches the bit pattern of a second bit stream when the bit value for each bit in the first bit stream is the same value as a corresponding bit in the second bit stream. At step 206, the HVAC device proceeds to step 208 when the HVAC device determines that the primary signal is present in the look-up table. Otherwise, the HVAC device proceeds to step 210 when the HVAC device determines that the primary signal is not present in the look-up table.

At step 208, the HVAC device uses the primary signal to identify a temperature value and a humidity value in the look-up table. The temperature value may be or may be similar to the temperature value 128 and the humidity value may be or may be similar to the humidity value 130 in FIG. 1. The HVAC device may use bit streams of the primary signal to identify a temperature value and/or a humidity value that are mapped to the corresponding bit stream in the look-up table when the primary signal is present in the look-up table. For example, a first bit stream in the primary signal may correspond with a first bit stream in the look-up table that is mapped to the temperature value and a second bit stream in the primary signal may correspond with a second bit stream in the look-up table that is mapped to the humidity value.

At step 210, the HVAC device uses the secondary signal to identify a temperature value and a humidity value in the look-up table. The HVAC device may use bit streams of the secondary signal to identify a temperature value and/or a humidity value that are mapped to a corresponding bit stream in the look-up table when the primary signal is not present in the look-up table. For example, a first bit stream in the secondary signal may correspond with a first bit stream in the look-up table that is mapped to the temperature value and a second bit stream in the secondary signal may correspond with a second bit stream in the look-up table that is mapped to the humidity value.

At step 212, the HVAC device outputs a control signal based on the determined temperature value and humidity value to HVAC equipment. The HVAC equipment may be or may be similar to HVAC equipment 164 and the control signal may be or may be similar to control signal 154 in FIG. 1. The control signal may indicate commands or actions to be performed by the HVAC equipment based on the determined temperature value and humidity value. For example, the control signal may indicate to turn on HVAC equipment, to turn off HVAC equipment, to adjust HVAC equipment, or any other action as would be appreciated by one of ordinary skill in the art upon viewing this disclosure. Additionally or alternatively, the control signal may comprise the determined temperature value and humidity value.

Figure 3:
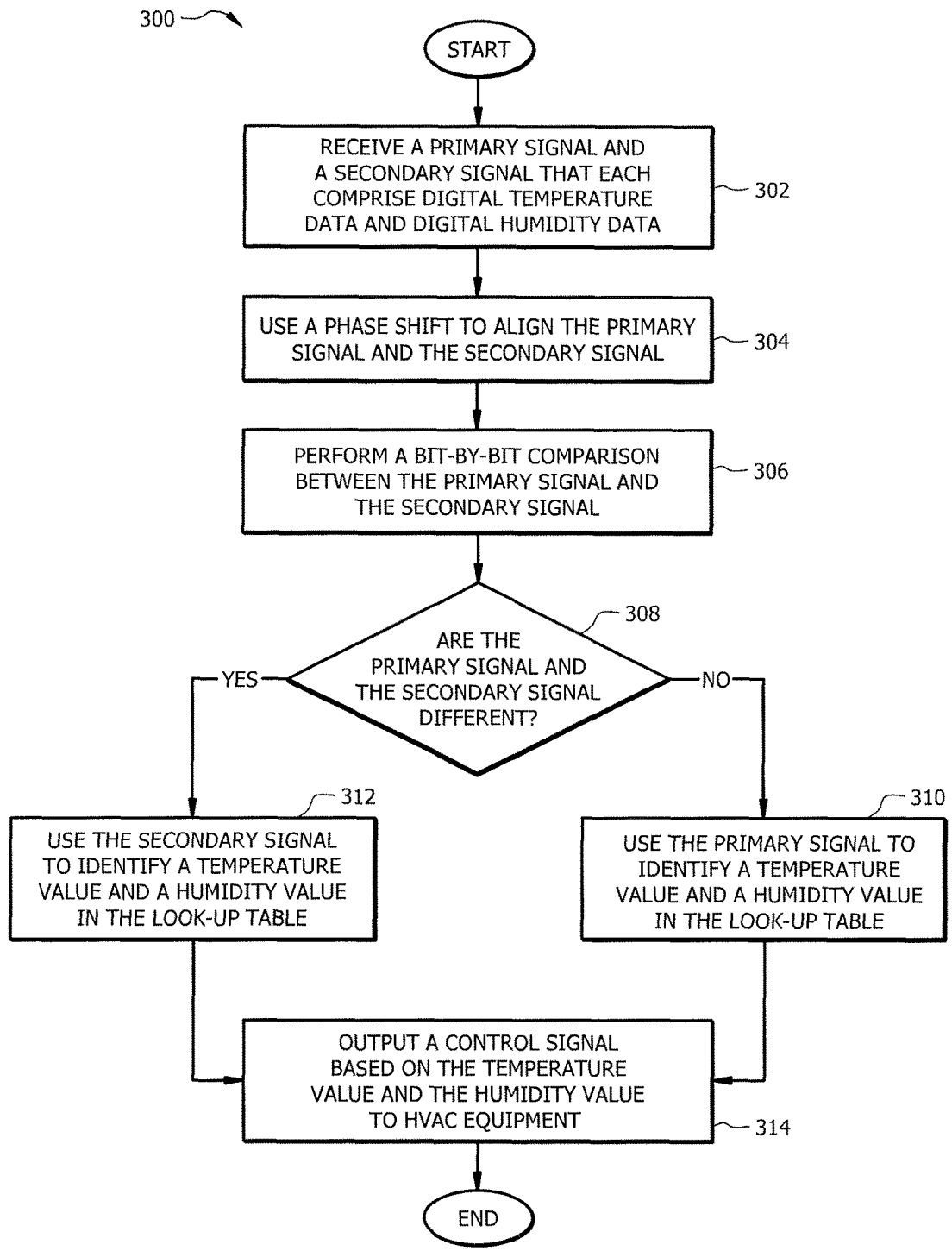
FIG. 3 is a flowchart of another embodiment of an HVAC communication method.

FIG. 3 is a flowchart of another embodiment of an HVAC communication method 300. Method 300 is implemented by an HVAC device to perform error checking on digital temperature data and digital humidity data that is transmitted using a primary signal and a secondary signal, to use the transmitted signals and a look-up table to determine a temperature value and a humidity value, and to output a control signal based on the temperature value and the humidity value. The HVAC device may be configured similarly to HVAC receiver device 162 in FIG. 1.

At step 302, the HVAC device receives a primary signal and a secondary that each comprise digital temperature data and digital humidity data. The primary signal may be or may be similar to the primary signal 150 and the secondary signal may be or may be similar to the secondary signal 152 in FIG. 1. The secondary signal is a phase shifted representation of the primary signal and comprises the same data as the primary signal. The HVAC device may process the primary signal and the secondary signal. For example, the HVAC device may parse, decode, decrypt, and/or demultiplex the primary signal and the secondary signal.

At step 304, the HVAC device uses a phase shift to align the primary signal and the secondary signal. The HVAC device may perform a bit shift or a phase shift on the primary signal or the secondary signal to align the primary signal and the secondary signal such that corresponding data types (e.g. temperature and humidity) are aligned. For example, a bit stream that corresponds with the digital temperature data in the primary signal is aligned with a bit stream that corresponds with the digital temperature data in the secondary signal, and so on. At step 306, the HVAC device performs a bit-by-bit comparison between the primary signal and the secondary signal. The HVAC device may traverse bit streams in the primary signal and bit streams in the secondary signal bit-by-bit to determine whether corresponding bit streams in the primary signal and the secondary signal are the same. The HVAC device may determine that a bit stream in the primary signal and a bit stream in the secondary signal are the same when corresponding bits within the bit streams are the same. In other words, a bit stream in the primary signal and a bit stream in the secondary signal are the same when the bit value (i.e. 1 or 0) for each bit in the bit stream in the primary signal is the same bit value as a corresponding bit in the bit stream in the secondary signal. Alternatively, the HVAC device may compare bit streams in the primary signal and bit streams in the secondary signal using a word-by-word comparison or any other suitable technique for determining whether corresponding bit streams in the primary signal and the secondary signal are the same as would be appreciated by one of ordinary skill in the art upon viewing this disclosure. At step 308, the HVAC device proceeds to step 310 when the primary signal and the secondary signal are not different (i.e. corresponding bit streams in the primary signal and the secondary signal are the same). Otherwise, the HVAC device proceeds to step 312 when the primary and the secondary signal are different.

At step 310, the HVAC device uses the primary signal to identify a temperature value and a humidity value in the look-up table. The temperature value may be or may be similar to the temperature value 128 and the humidity value may be or may be similar to the humidity value 130 in FIG. 1. The HVAC device may compare bit streams in the primary signal to bit streams in the look-up table to identify corresponding bit streams in the look-up table and to identify the temperature value and/or the humidity value that are mapped to the corresponding bit streams in the look-up table when the primary signal and the secondary signal are the same. For example, a first bit stream in the primary signal may correspond with a first bit stream in the look-up table that is mapped to the temperature value and a second bit stream in the primary signal may correspond with a second bit stream in the look-up table that is mapped to the humidity value.

At step 312, the HVAC device uses the secondary signal to identify a temperature value and a humidity value in the look-up table. The HVAC device may use bit streams of the secondary signal to identify corresponding bit streams in the look-up table and to identify the temperature value and/or the humidity value that are mapped to the corresponding bit streams in the look-up table when the primary signal and the secondary signal are different. For example, a first bit stream in the secondary signal may correspond with a first bit stream in the look-up table that is mapped to the temperature value and a second bit stream in the secondary signal may correspond with a second bit stream in the look-up table that is mapped to the humidity value.

At step 314, the HVAC device outputs a control signal based on the determined temperature value and humidity value to HVAC equipment. The HVAC equipment may be or may be similar to HVAC equipment 164 and the control signal may be or may be similar to control signal 154 in FIG. 1. The control signal may indicate commands or actions to be performed by the HVAC equipment based on the determined temperature value and humidity value. Additionally or alternatively, the control signal may comprise the determined temperature value and humidity value.

Figure 4:
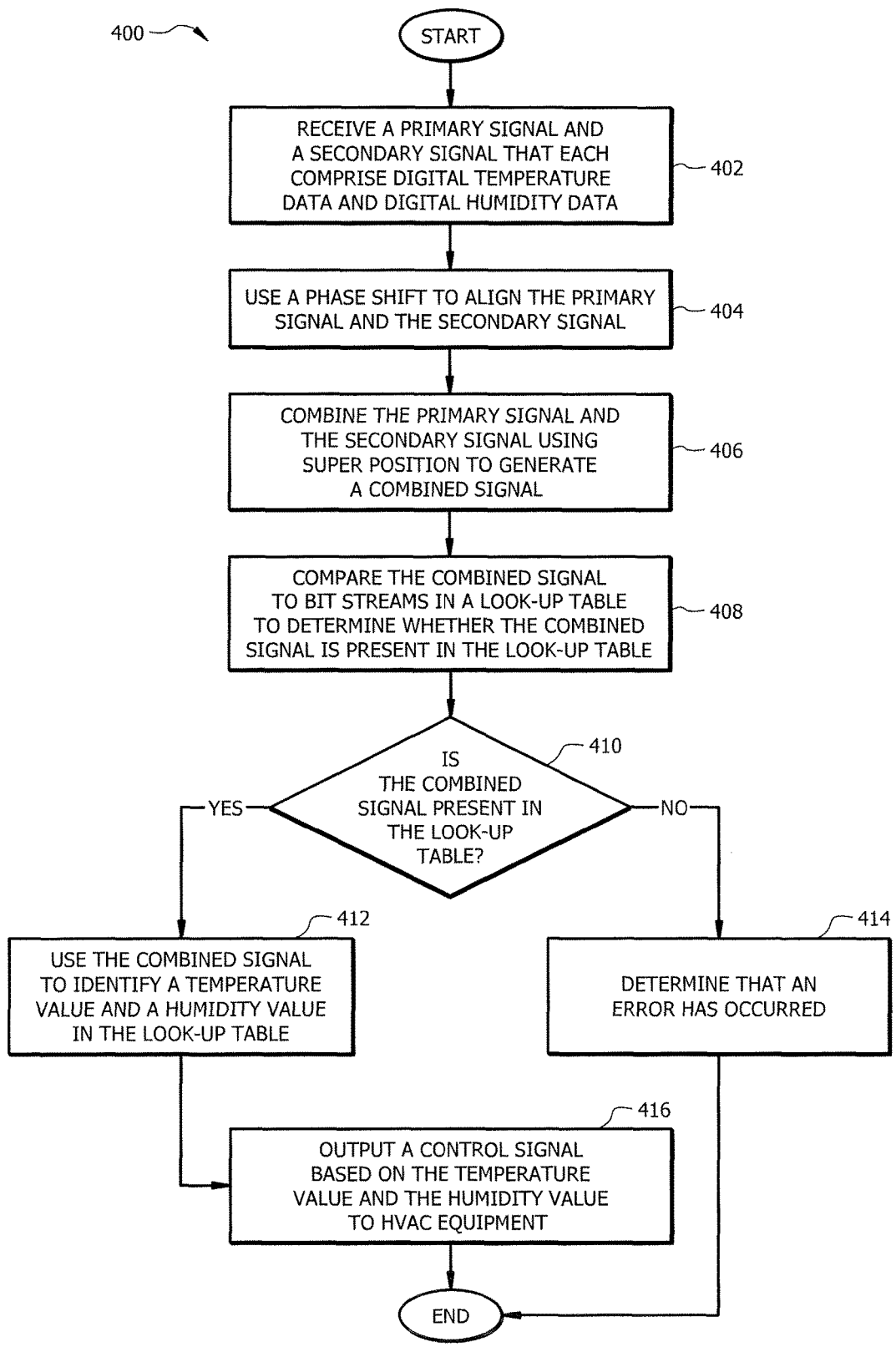
FIG. 4 is a flowchart of another embodiment of an HVAC communication method.

FIG. 4 is a flowchart of another embodiment of an HVAC communication method 400. Method 400 is implemented by an HVAC device to perform error checking on digital temperature data and digital humidity data that is transmitted using a primary signal and a secondary signal, to use the transmitted signals and a look-up table to determine a temperature value and a humidity value, and to output a control signal based on the temperature value and the humidity value. The HVAC device may be configured similarly to HVAC receiver device 162 in FIG. 1.

At step 402, the HVAC device receives a primary signal and a secondary signal that each comprise digital temperature data and digital humidity data. The primary signal may be or may be similar to the primary signal 150 and the secondary signal may be or may be similar to the secondary signal 152 in FIG. 1. The secondary signal is a phase shifted representation of the primary signal and comprises the same data as the primary signal. The HVAC device may process the primary signal and the secondary signal. For example, the HVAC device may parse, decode, decrypt, and/or demultiplex the primary signal and the secondary signal.

At step 404, the HVAC device uses a phase shift to align the primary signal and the secondary signal. The HVAC device may use a phase shift to align the primary signal and the secondary signal similar to as described in step 304 in FIG. 3. The HVAC device may perform a bit shift or a phase shift on the primary signal or the secondary signal to align the primary signal and the secondary signal such that corresponding data types (e.g. temperature and humidity) are aligned. For example, a bit stream that corresponds the digital temperature data in the primary signal is aligned with a bit stream that corresponds with the digital temperature data in the secondary signal. At step 406, the HVAC device combines the primary signal and the secondary signal using superposition to generate a combined signal. For example, the HVAC device may perform an AND operation between bit streams of the primary signal and bit streams of the secondary signal to generate the combined signal. Alternatively, the HVAC device may perform any other suitable technique for generating the combined signal using superposition. The combined signal comprises the one or more bit streams that correspond with the digital temperature data and the digital humidity data.

At step 408, the HVAC device compares the combined signal to bit streams in a look-up table to determine whether the combined signal is present in the look-up table. The look-up table may be or may be similar to look-up table 126 in FIG. 1. The HVAC device may compare the bit streams in the combined signal to the bit streams in the look-up table to determine whether the combined signal is present in the look-up table. The combined signal is present in the look-up table when one or more bit streams in the combined signal match corresponding bit streams in the look-up table. For example, the combined signal is present when the bit pattern of a bit stream in the combined signal matches the bit pattern of a bit stream in the look-up table. At step 410, the HVAC device proceeds to step 412 when the combined signal is present in the look-up table. Otherwise, the HVAC device proceeds to step 414 when the combined signal is not present in the look-up table.

At step 412, the HVAC device uses the combined signal to identify a temperature value and a humidity value in the look-up table. The temperature value may be or may be similar to the temperature value 128 and the humidity value may be or may be similar to the humidity value 130 in FIG. 1. For example, the HVAC device may use bit streams of the combined signal to identify the temperature value and/or humidity value that are mapped to corresponding bit streams in the look-up table when the combined signal is present in the look-up table.

At step 416, the HVAC device outputs a control signal based on the determined temperature value and humidity value to HVAC equipment. The HVAC equipment may be or may be similar to HVAC equipment 164 and the control signal may be or may be similar to control signal 154 in FIG. 1. The control signal may indicate commands or actions to be performed by the HVAC equipment based on the determined temperature value and humidity value. Additionally or alternatively, the control signal may comprise the determined temperature value and humidity value.

Returning to step 410, the HVAC device proceeds to step 414 when the combined signal is not present in the look-up table. At step 414, the HVAC device determines that an error has occurred. Additionally, the HVAC device may trigger a flag or an alert in response to determining an error has occurred.

Figure 5:
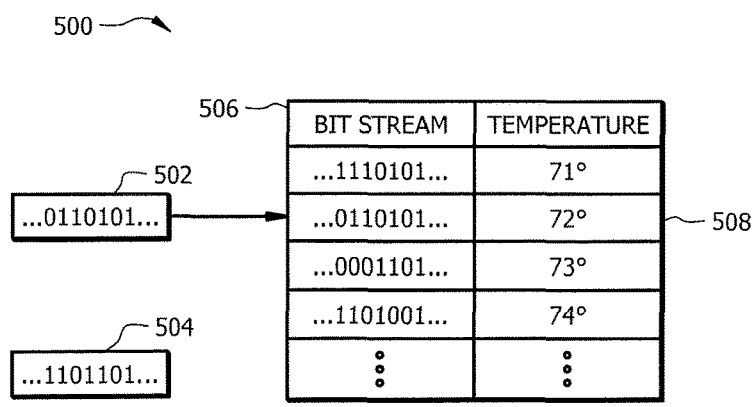
FIG. 5 is a schematic diagram of an embodiment of a bit stream comparison for an HVAC communication method.

FIG. 5 is a schematic diagram of an embodiment of a bit stream comparison 500 for an HVAC communication method such as HVAC communication method 200 in FIG. 2. Bit stream comparison 500 is an example of determining a temperature value 508 (e.g. temperature value 128 in FIG. 1) using a primary signal 502 and a secondary signal 504 that are received by an HVAC receiver device (e.g. HVAC receiver device 162 in FIG. 1). The primary signal 502 may be or may be similar to primary signal 150 and the secondary signal 504 may be or may be similar to the secondary signal 152 in FIG. 1.

The HVAC receiver device receives the primary signal 502 and the secondary signal 504 and compares the bit stream of the primary signal 502 to bit streams in a look-up table 506. The look-up table 506 may be or may be similar to the look-up table 126 in FIG. 1. The HVAC receiver device compares the bit pattern of the bit stream in the primary signal 502 to the bit patterns of bit streams in the look-up table 506 and uses the comparison to determine whether the primary signal 502 is present in the look-up table 506. The HVAC receiver device determines that the primary signal 502 is present when the bit pattern of the bit stream in the primary signal 502 matches a bit pattern of a bit stream in the look-up table 506. In FIG. 5, the primary signal 502 is present in the look-up table 506 so the HVAC receiver device uses the bit stream of the primary signal 502 to identify the temperature value 508 (i.e. 72°) that is mapped to the corresponding bit stream in the look-up table 506. The HVAC receiver device may use the bit stream of the secondary signal 504 to identify the temperature value 508 that is mapped to a corresponding bit stream in the look-up table 506 when the primary signal 502 is not present in the look-up table 506.

Figure 6:
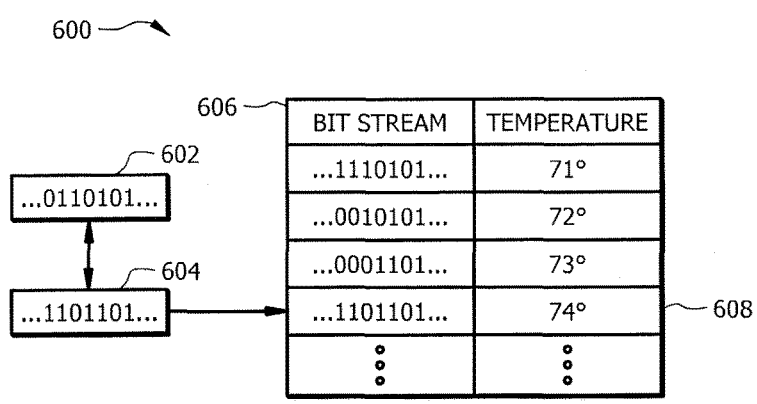
FIG. 6 is a schematic diagram of another embodiment of a bit stream comparison for an HVAC communication method.

FIG. 6 is a schematic diagram of another embodiment of a bit stream comparison 600 for an HVAC communication method such as HVAC communication method 300 in FIG. 3. Bit stream comparison 600 is an example of determining a temperature value 608 (e.g. temperature value 128 in FIG.

1) using a primary signal 602 and a secondary signal 604 that are received by an HVAC receiver device (e.g. HVAC receiver device 162 in FIG. 1). The primary signal 602 may be or may be similar to primary signal 150 and the secondary signal 604 may be or may be similar to the secondary signal 152 in FIG. 1.

The HVAC receiver device receives the primary signal 602 and the secondary signal 604 and aligns the primary signal 602 and the secondary signal 604 using a phase shift or a bit shift. The primary signal 602 and the secondary signal 604 are aligned such that corresponding data types (e.g. temperature) are aligned. The HVAC receiver device then performs a bit-by-bit comparison of the bit stream of the primary signal 602 with the bit stream of the secondary signal 604. The HVAC receiver device compares the bit pattern of the bit stream in the primary signal 602 to the bit pattern of the bit stream in the secondary signal 604 and uses the comparison to determine whether the primary signal 602 and the secondary signal 604 are the same. The HVAC receiver device determines that the primary signal 602 and the secondary signal 604 are the same when the bit pattern of the bit stream in the primary signal 602 matches a bit pattern of the bit stream in the secondary signal 604. In FIG. 6, the primary signal 602 and the secondary signal 604 are different so the HVAC receiver device uses the bit stream of the secondary signal 604 to identify the temperature value 608 (i.e. 74°) that is mapped to a corresponding bit stream in the look-up table 606. The look-up table 606 may be or may be similar to the look-up table 126 in FIG. 1. The HVAC receiver device may use the bit stream of the primary signal 602 to identify the temperature value 608 that is mapped to a corresponding bit stream in the look-up table 606 when the primary signal 602 is the same as the secondary signal 604.

Figure 7:
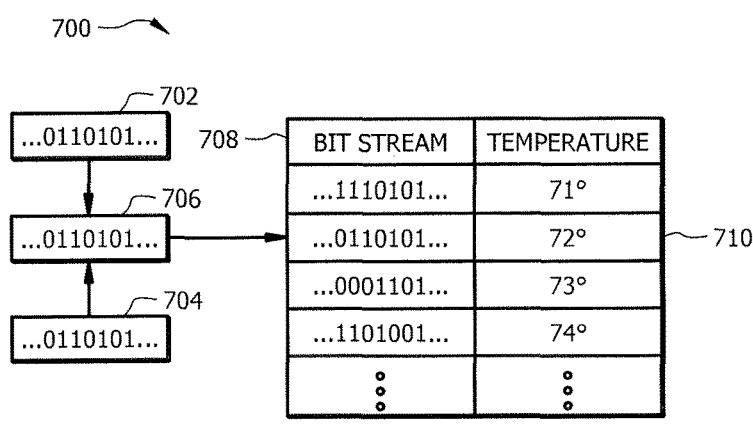
FIG. 7 is a schematic diagram of another embodiment of a bit stream comparison for an HVAC communication method.

FIG. 7 is a schematic diagram of another embodiment of a bit stream comparison 700 for an HVAC communication method such as HVAC communication method 400 in FIG. 4. Bit stream comparison 700 is an example of using a primary signal 702 and a secondary signal 704 that are received by an HVAC receiver device (e.g. HVAC receiver device 162 in FIG. 1) to generate a combined signal 706 and determining a temperature value 710 (e.g. temperature value 128 in FIG. 1) using the combined signal 706. The primary signal 702 may be or may be similar to primary signal 150 and the secondary signal 704 may be or may be similar to the secondary signal 152 in FIG. 1.

The HVAC receiver device receives the primary signal 702 and the secondary signal 704 and aligns the primary signal 702 and the secondary signal 704 using a phase shift or a bit shift. The primary signal 702 and the secondary signal 704 are aligned such that corresponding data types (e.g. temperature) are aligned. The HVAC receiver device then combines the primary signal 702 and the secondary signal 704 using superposition to generate the combined signal 706. For example, the HVAC receiver device may perform an AND operation between bit streams of the primary signal 702 and bit streams of the secondary signal 704 to generate the combined signal 706. Alternatively, the HVAC receiver device may perform any other suitable technique for generating the combined signal 706 using superposition. The HVAC receiver device then compares the combined signal 706 to bit streams in a look-up table 708 to determine whether the combined signal 706 is present in the look-up table 708. The look-up table 708 may be or may be similar to look-up table 126 in FIG. 1. The HVAC receiver device may compare the bit streams in the combined signal 706 to the bit streams in the look-up table 708 to determine whether the combined signal 706 is present in the look-up table 708. The combined signal 706 is present in the look-up table 708 when the bit stream in the combined signal 706 match a corresponding bit stream in the look-up table 708. In FIG. 7, the combined signal 706 is present in the look-up table 708 so the HVAC receiver device uses the combined signal 706 to identify the temperature value 710 in the look-up table 708.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A heating, ventilation, and air conditioning (HVAC) system comprising:
   a temperature sensor;
   a first analog-to-digital converter (ADC) operably coupled to the temperature sensor, wherein the first ADC is configured to output digital temperature data;
   a humidity sensor;
   a second ADC operably coupled to the humidity sensor, wherein the second ADC is configured to output digital humidity data;
   a first radio transmitter configured to transmit a primary signal, wherein the primary signal comprises the digital temperature data and the digital humidity data;
   a second radio transmitter configured to transmit a secondary signal, wherein the secondary signal comprises the digital temperature data and the digital humidity data of the primary signal;
   a first memory operable to store a look-up table that maps bit streams to temperature values and humidity values;
   a first microprocessor operably coupled to the first ADC, the second ADC, the first radio transmitter, the second radio transmitter, and the first memory, and configured to generate the primary signal and the secondary signal, wherein the secondary signal is a phase shifted representation of the primary signal;
   a first radio receiver configured to receive the primary signal;
   a second radio receiver configured to receive the secondary signal;

a second memory operable to store the look-up table that maps bit streams to temperature values and humidity values;
a second microprocessor operably coupled to the first radio receiver, the second radio receiver, and the second memory, and configured to:
perform a comparison using the primary signal to execute error checking, wherein performing the comparison comprises:
using a phase shift to align the primary signal and the secondary signal; and
performing a bit-by-bit comparison between the primary signal and the secondary signal; and
determine a temperature value and a humidity value using the look-up table based on the comparison; and
wherein at least one of the determined temperature value and the determined humidity value is used to perform an HVAC-related operation.

2. The system of claim 1, wherein:
determining the temperature value and the humidity value comprises using the primary signal to identify the temperature value and the humidity value in the look-up table when the primary signal and the secondary signal are the same.

3. The system of claim 1, wherein:
determining the temperature value and the humidity value comprises using the secondary signal to identify the temperature value and the humidity value in the look-up table when the primary signal and the secondary signal are different.

4. The system of claim 1, further comprising:
combining the primary signal and the secondary signal using superposition to generate a combined signal; and
comparing the combined signal to the bit streams in the look-up table to determine whether the combined signal is present in the look-up table; and
wherein determining the temperature value and the humidity value comprises using the combined signal to identify the temperature value and the humidity value in the look-up table when the combined signal is present in the look-up table.

5. The system of claim 1, wherein:
the second microprocessor is operably coupled to HVAC equipment; and
the second microprocessor is configured to output a control signal to the HVAC equipment based on the determined temperature value and humidity value.

6. The system of claim 1, wherein the primary signal comprises:
a first bit stream that represents the digital temperature data; and
a second bit stream that represents the digital humidity data.

7. The system of claim 1, wherein the primary signal comprises a bit stream that represents the combination of the digital temperature data and the digital humidity data.

8. A heating, ventilation, and air conditioning (HVAC) method comprising:
generating, at a transmitter device, a primary signal that comprises digital temperature data and digital humidity data;
generating, at the transmitter device a secondary signal, wherein the secondary signal is a phase shifted representation of the primary signal;
transmitting, at the transmitter device, the primary signal and the secondary signal to a receiver device via a wireless link;
storing, at the receiver device, a look-up table that maps bit streams to temperature values and humidity values;
performing, at the receiver device, a comparison using the primary signal to execute error checking, wherein performing a comparison comprises:
using a phase shift to align the primary signal and the secondary signal; and
performing a bit-by-bit comparison between the primary signal and the secondary signal;
determining, at the receiver device, a temperature value and a humidity value using the look-up table based on the comparison; and
performing an HVAC-related operation at an HVAC system, the HVAC-related operation based on at least one of the determined temperature value and the determined humidity value.

9. The method of claim 8, wherein:
determining the temperature value and the humidity value comprises using the primary signal to identify the temperature value and the humidity value in a look-up table when the primary signal and the secondary signal are the same.

10. The method of claim 8, wherein:
determining the temperature value and the humidity value comprises using the secondary signal to identify the temperature value and the humidity value in the look-up table when the primary signal and the secondary signal are different.

11. The method of claim 8, further comprising:
combining, at the receiver device, the primary signal and the secondary signal using superposition to generate a combined signal; and
comparing, at the receiver device, the combined signal to bit streams in a look-up table to determine whether the combined signal is present in the look-up table; and
wherein determining the temperature value and the humidity value comprises using the combined signal to identify the temperature value and the humidity value in the look-up table when the combined signal is present in the look-up table.

12. The method of claim 8, wherein performing the comparison using the primary signal comprises:
using, at the receiver device, a phase shift to align the primary signal and the secondary signal;
combining, at the receiver device, the primary signal and the secondary signal using superposition to generate a combined signal; and
comparing, at the receiver device, the combined signal to bit streams in a look-up table to determine whether the combined signal is present in the look-up table; and
indicating, at the receiver device, an error has occurred when the combined signal is not present in the look-up table.

13. The method of claim 8, wherein the primary signal comprises:
a first bit stream that represents the digital temperature data; and
a second bit stream that represents the digital humidity data.

14. The method of claim 8, further comprising outputting a control signal to HVAC equipment based on the determined temperature value and humidity value.

15. A heating, ventilation, and air conditioning (HVAC) device comprising:
a first radio receiver configured to receive a primary signal comprising digital temperature data and digital humidity data;

a second radio receiver configured to receive a secondary signal, wherein the secondary signal is a phase shifted representation of the primary signal;

a memory operable to store a look-up table that maps bit streams to temperature values and humidity values; and a microprocessor operably coupled to the first radio receiver, the second radio receiver, and the memory, and configured to:

use a phase shift to align the primary signal and the secondary signal;

perform a bit-by-bit comparison between the primary signal and the secondary signal;

determine a temperature value and a humidity value using the primary signal to identify the temperature value and the humidity value in the look-up table when the primary signal and the secondary signal are the same;

determine the temperature value and the humidity value using the secondary signal to identify the temperature value and the humidity value in the look-up table when the primary signal and the secondary signal are different; and wherein at least one of the determined temperature value and the determined humidity value is used to perform an HVAC-related operation.

16. The device of claim 15, wherein:

the microprocessor is operably coupled to HVAC equipment; and the microprocessor is configured to output a control signal to the HVAC equipment based on the determined temperature value and humidity value.

* * * * *